July 23, 1968
P. LUGINBUHL
3,393,813
APPARATUS FOR SEPARATING AND TRANSFERRING OBJECTS
Filed Aug. 5, 1966
5 Sheets-Sheet 2
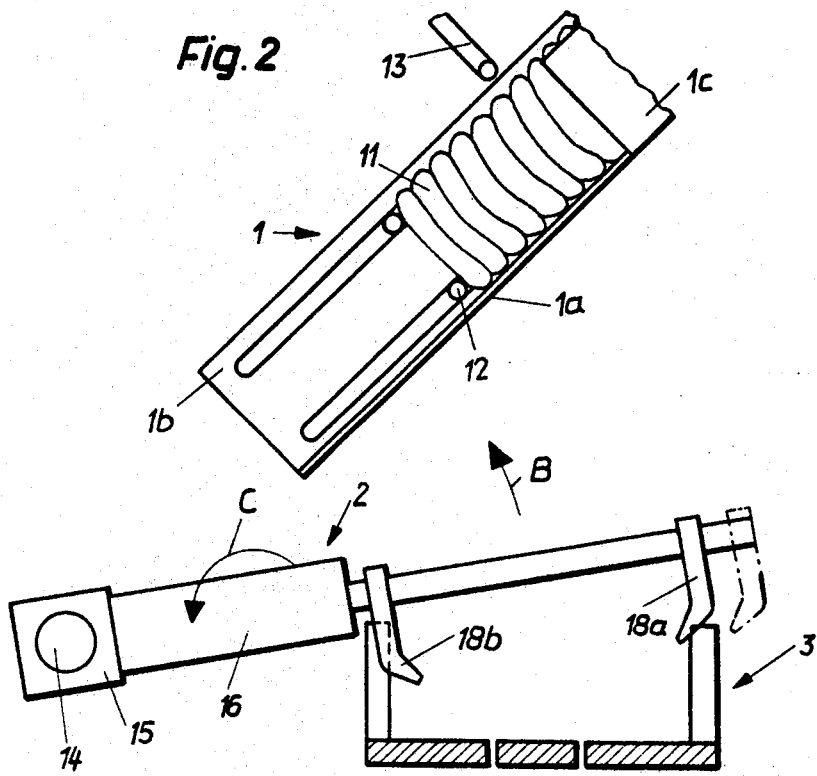
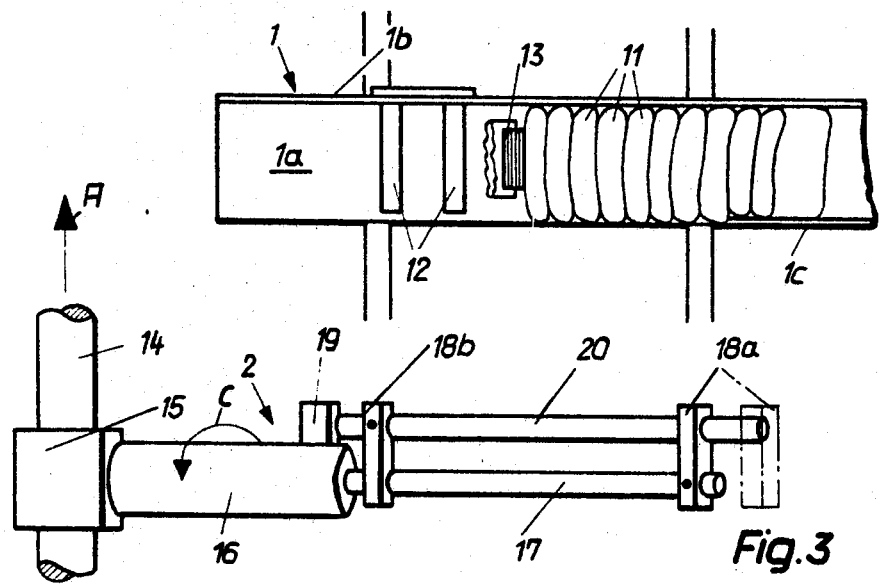

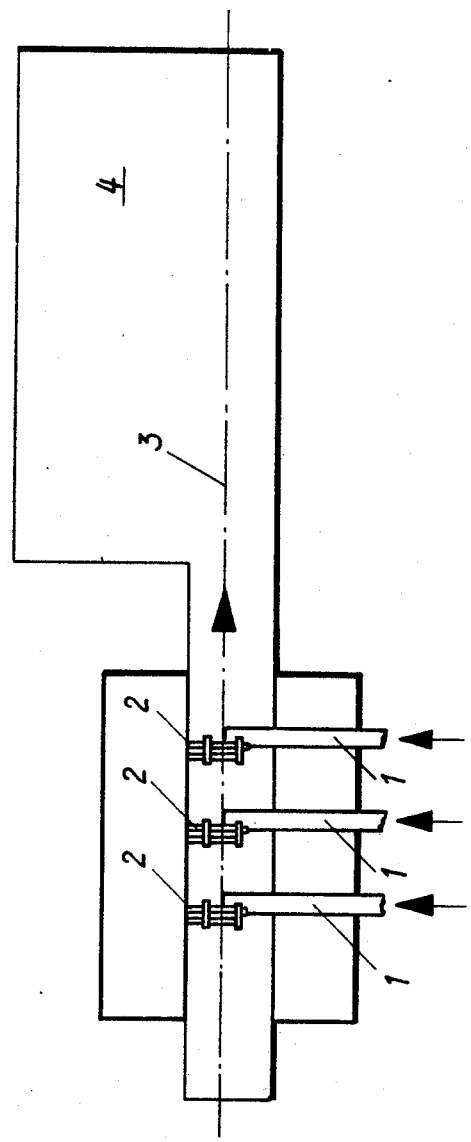

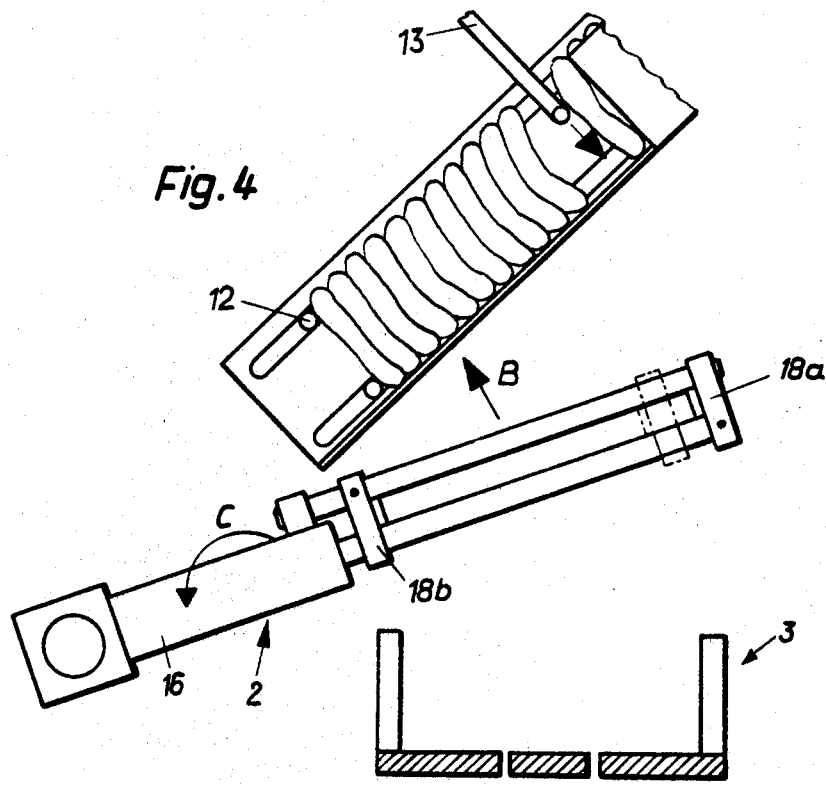
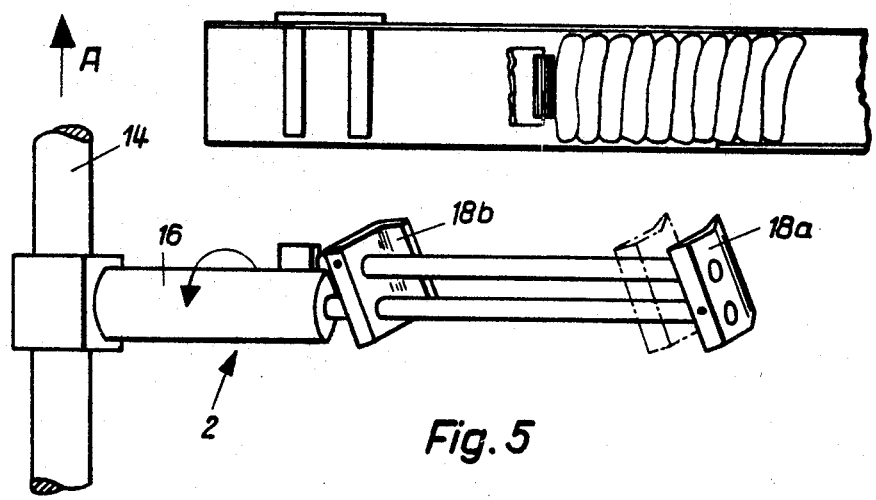

July 23, 1968 P. LUGINBUHL 3,393,813
APPARATUS FOR SEPARATING AND TRANSFERRING OBJECTS
Filed Aug. 5, 1966 5 Sheets-Sheet 4

July 23, 1968  P. LUGINBUHL  3,393,813
APPARATUS FOR SEPARATING AND TRANSFERRING OBJECTS
Filed Aug. 5, 1966  5 Sheets-Sheet 5
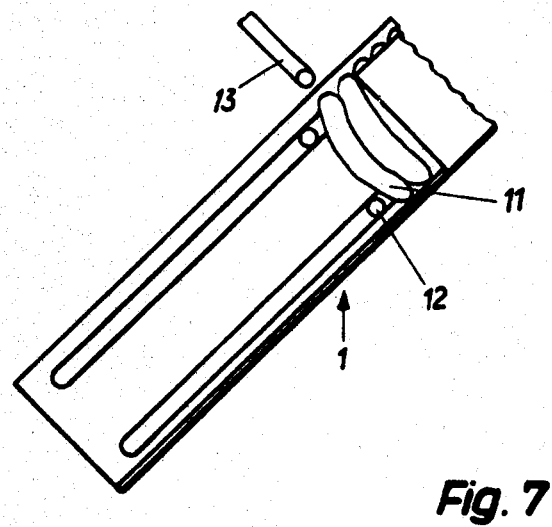
*Fig. 7*
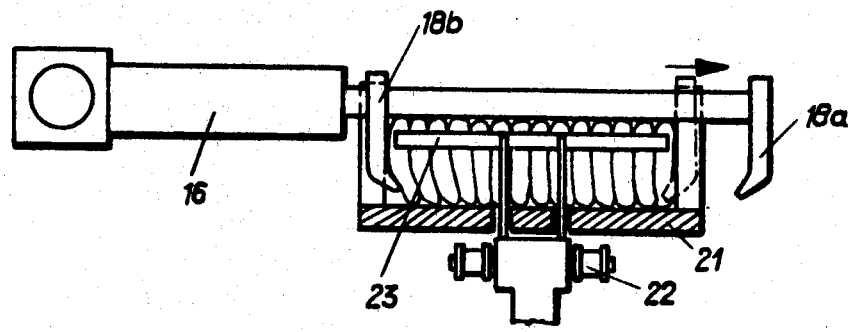

United States Patent Office 3,393,813
Patented July 23, 1968

3,393,813
APPARATUS FOR SEPARATING AND
TRANSFERRING OBJECTS
Pierre Luginbuhl, Neuhausen am Rheinfall, Switzerland,
assignor to Schweizerische Industrie-Gesellschaft, Neuhausen am Rheinfall, Switzerland
Filed Aug. 5, 1966, Ser. No. 570,562
Claims priority, application Switzerland, Aug. 6, 1965, 11,073/65
2 Claims. (Cl. 214—8.5)

ABSTRACT OF THE DISCLOSURE

The invention relates to an apparatus wherein a plurality of flat disc-like objects are being fed in a continuous stream to a point of transfer. At said point a predetermined number of said articles on the forward end of said stream are separated from the remainder of the stream. An article gripper grasps said number of articles and transfers them along a swinging and rotating path to a conveyor wherein the number of articles are deposited and carried to a point remote from said point of transfer.

---

The invention relates to an apparatus for separating from a column of contiguous articles or stack of predetermined length and for transferring the separated stack on to a conveyor means.

According to the present invention such an apparatus comprises article delivery means, means for holding and lowering the objects within the delivery means, means for separating the stack of objects to be transferred and means for seizing the separated stack and for transferring it on to the conveyor means.

The invention will be described further, by way of example, with reference to the accompanying drawings, in which:

FIG. 1 schematically shows a horizontal projection of the whole apparatus, as fitted to a packaging machine;

FIG. 2 shows on an enlarged scale a side elevation of a shaft and of a gripping device in a first working position;

FIG. 3 is a horizontal projection of the parts in FIG. 2;

FIGS. 4 and 5 show the parts according to FIG. 2 in a different working position, respectively in side elevation and as viewed from above, and FIGS. 6 and 7 show a side elevation of the parts according to FIG. 2 in two further working positions.

Figure 6:
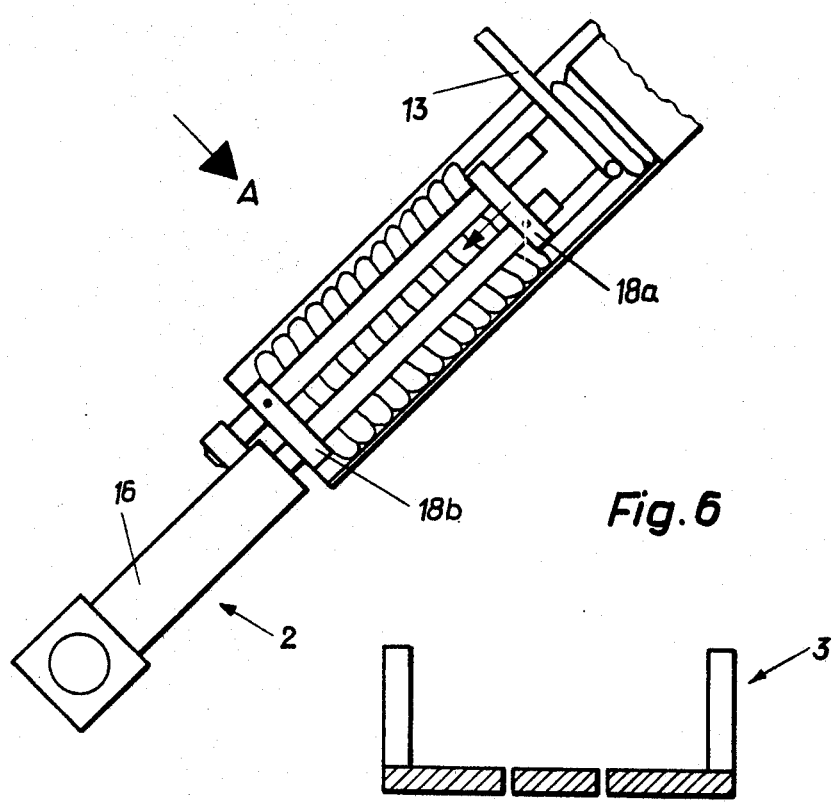

FIG. 1 shows schematically a horizontal projection of the apparatus according to the invention fitted to a packaging machine. Disc-shaped objects, for example biscuits, slide downwardly in stacked formation in three oblique shafts 1. At the lower end of each shaft there is arranged a gripper assembly 2, which seizes a stack of biscuits, previously separated in the shaft, and transfers the stack to a conveyor 3 leading to a packaging machine 4.

FIGS. 2 and 3 show one of the shafts and one of the gripper assemblies 2 in a working position, in which the gripper assembly 2 is about to pivot upwards, in order to seize a biscuit stack 11. The upper portion of the shaft 1 is of U-shaped cross-section having a bottom 1a and side walls 1b, 1c. In the lower portion of the shaft, the side wall 1c has been omitted in order to enable the gripper assembly 2 to seize the biscuits. The biscuits slide in stacked arrays in a downward direction owing to the inclination of the shaft. A holder 12, displaceable along the shaft, prevents the biscuits from falling out of the shaft 1. A slidable separator 13 is arranged above the shaft 1, which is movable perpendicularly to the shaft bottom 1a and can be pushed between the biscuits.

The gripper assembly 2 is mounted on a shaft 14 which is axially displaceable and pivotable about its longitudinal axis, as indicated by the arrows A and B. A cylinder 16, mounted on a base 15, is pivotable through 90° as indicated by the arrow C. The interior of the cylinder 16 accommodates a piston (not shown), which is rigidly connected to a piston rod 17. The external end of the rod 17 carries a first clamp 18a rigidly fixed thereto. The cylinder 16 further has a projection 19, carrying a rod 20, which extends parallel to the piston rod 17, but in contrast to the latter is not movable. A second clamp 18b is rigidly fastened to the rod 20.

Clamps 18a and 18b are respectively mounted with a sliding fit on rods 20 and 17. By the action of e.g. compressed air or pressurized oil on the piston located in cylinder 16, the rod 17 can be axially displaced and this changes the spacing between clamps 18a, 18b, enabling the clamps to seize and to release again a biscuit stack. The piston could of course also be actuated by purely mechanical means.

The apparatus operates in the following manner. As can be seen in FIG. 2, the holder 12 supporting the biscuit stack is lowered to a predetermined point in the shaft 1. Following this, the slide separator 13 moves between the biscuits, while the holder 12 moves into its lowermost position as shown in FIG. 4. In this manner, a biscuit stack of predetermined length has been separated from the other biscuits stacked in the shaft. During this operation the gripper assembly 2 has been swung upwards in the direction of the arrow B and rotated by 90° in the direction of the arrow C in the position shown in FIG. 4. Hereupon, by displacement in the direction of arrow A (FIG. 5), the gripper assembly is moved in such a manner in relation to the shaft, that the clamps 18a, 18b seize and grip both ends of the biscuit stack. The clamp 18b engages between the tow bars of the holder 12.

The biscuit stack seized by the clamps is then guided out of the shaft 1 and, after pivoting of the clamps through 90°, the stack is deposited in a U-shaped channel 21 of the conveyor 3. From here, the stack is conveyed by a conveyor member 23, arranged for example on an endless chain 22, to a packaging machine, whereupon the process is repeated.

By suitably constructing the conveyor, it would be also possible to effect the transfer of the biscuit stack from the shaft to the transport band without pivoting the clamps through 90°.

What I claim is:

1. An apparatus for separating from a column of contiguous articles a stack of predetermined length and for transferring the separated stack to a conveyor means comprising article delivery means, means for holding and lowering the objects within the delivery means, means for separating the stack of objects to be transferred comprising a slide separator movable perpendicularly to said delivery means, and means for seizing the separated stack and transferring it on to said conveyor means, said seizing and transferring means including a gripper assembly which is displaceable in the direction of said conveyor means and is pivotable perpendicularly thereto and is provided with adjustable clamps.

2. An apparatus as claimed in claim 1, in which the clamps are pivotable through 90° about the longitudinal axis of the gripper assembly.

References Cited

UNITED STATES PATENTS 2,553,683    5/1951    Smith _____ 214—8.5
3,228,538    1/1966    Coates _____ 214—8.5 X ROBERT G. SHERIDAN, *Primary Examiner.*

G. F. ABRAHAM, *Assistant Examiner.*